United States Patent
Wu et al.

(10) Patent No.: US 9,524,486 B2
(45) Date of Patent: Dec. 20, 2016

(54) SYSTEM AND METHOD FOR RETAIL STORE PROMOTIONAL PRICE TAG DETECTION AND MAINTENANCE VIA HEURISTIC CLASSIFIERS

(71) Applicant: Xerox Corporation, Norwalk, CT (US)

(72) Inventors: Wencheng Wu, Rochester, NY (US); Dennis L. Venable, Marion, NY (US); Thomas F. Wade, Rochester, NY (US); Peter Paul, Webster, NY (US); Adrien P. Cote, Clarkson, CA (US)

(73) Assignee: Xerox Corporation, Norwalk, CT (US)

( * ) Notice: Subject to any disclaimer, the term of this patent is extended or adjusted under 35 U.S.C. 154(b) by 25 days.

(21) Appl. No.: 14/637,830

(22) Filed: Mar. 4, 2015

(65) Prior Publication Data

US 2016/0260051 A1    Sep. 8, 2016

(51) Int. Cl.
    *G06F 19/00*    (2011.01)
    *G06Q 10/08*    (2012.01)
    *G06K 9/46*     (2006.01)
    *G06T 11/60*    (2006.01)

(52) U.S. Cl.
    CPC .......... *G06Q 10/087* (2013.01); *G06K 9/4604* (2013.01); *G06T 11/60* (2013.01)

(58) Field of Classification Search
    USPC ............................................ 235/385; 705/28
    See application file for complete search history.

(56) References Cited

U.S. PATENT DOCUMENTS

| | | | |
|---|---|---|---|
| 2008/0077511 A1* | 3/2008 | Zimmerman | G06Q 10/00 705/28 |
| 2010/0171826 A1* | 7/2010 | Hamilton | G06Q 30/06 348/135 |
| 2014/0111538 A1 | 4/2014 | Wu et al. | |

OTHER PUBLICATIONS

Romberg et al., Scalable Logo Recognition in Real-World Images, Technical Report Apr. 2011. University of Augsburg, Institute of Computer Science, Mar. 2011. Published in Proceedings of\ACM International Conference on Multimedia Retrieval, 2011.

* cited by examiner

*Primary Examiner* — Rafferty Kelly
(74) *Attorney, Agent, or Firm* — Alix, Yale & Ristas, LLP

(57) ABSTRACT

A system to detect and maintain retail store promotional price tags (PPTs) includes a heuristic PPT description extractor module, a heuristic rule deriver module, a store shelf image acquisition system, a barcode locator and recognizer module, and a heuristic PPT classifier module. The heuristic PPT description extractor module extracts heuristic descriptions of PPTs. The heuristic rule deriver module derives a set of heuristic parameters for the PPTs. The barcode locator and recognizer module analyzes images acquired by the store shelf image acquisition system to localize and recognize barcodes. The heuristic PPT description classifier module extracts heuristic attributes from the images acquired by the store shelf image acquisition system using the set of PPT parameters supplied by the heuristic rule deriver module.

36 Claims, 14 Drawing Sheets

SYSTEM AND METHOD FOR RETAIL STORE PROMOTIONAL PRICE TAG DETECTION AND MAINTENANCE VIA HEURISTIC CLASSIFIERS

BACKGROUND

This disclosure relates generally to systems and methods for maintaining the displayed pricing of retail inventory. More particularly, the present disclosure relates to systems and methods for maintaining promotional price tags/signage in a retail store.

There are a large number of retail chains worldwide across various market segments, including pharmacy, grocery, home improvement, and others. One practice that many such chains have in common is sale advertising and merchandising. An element of this practice is the printing and posting of sale item signage within each store, very often at a weekly cadence.

Managed print services vendors providing this weekly signage have an interest in supplying the signage to all stores within a chain. It would be advantageous to each store if this signage was printed and packed in the order in which an employee posts the signs on the shelves (which is also the order in which a person encounters sale products while walking down each aisle). Doing so eliminates a non-value-add step of manually having to pre-sort the signage into the specific order appropriate for a given store.

Unfortunately, with few exceptions, retail chains cannot control or predict the product locations across each of their stores. This may be due to a number of factors: store manager discretion, local product merchandising campaigns, different store sizes and layouts, etc. Thus it would be advantageous to a retail chain to be able to collect product location data (referred to as a store profile) automatically across its stores, since each store could then receive signage in an appropriate order to avoid a pre-sorting step.

The system described herein detects and recognizes various promotional price tags/signage in a retail store. It may be used to improve the retail store management: resource and efficiency, by auditing missing or out-of-date promotional price tags/signage and informing staff where they are located.

SUMMARY

There is provided a system to detect and maintain retail store promotional price tags comprising a heuristic promotional price tag description extractor module, a heuristic rule deriver module, a store shelf image acquisition system, a barcode locator and recognizer module, and a heuristic promotional price tag classifier module. The heuristic promotional price tag description extractor module extracts heuristic descriptions of promotional price tags. The heuristic rule deriver module is in communication with the heuristic promotional price tag description extractor module, and derives a set of parameters for the promotional price tags. The store shelf image acquisition system acquires shelf images in a retail store. The barcode locator and recognizer module is in communication with the store shelf image acquisition system and analyzes images acquired by the store shelf image acquisition system to localize barcodes. The heuristic promotional price tag classifier module is in communication with the barcode locator and recognizer module and the heuristic rule deriver module. The heuristic promotional price tag description classifier module extracts heuristic attributes from the images acquired by the store shelf image acquisition system using the set of promotional price tag parameters supplied by the heuristic rule deriver module.

There is also provided a method of detecting and maintaining retail store promotional price tags using heuristic classifiers. The method comprises extracting heuristic descriptions from at least one exemplar promotional price tag having a barcode, deriving heuristic parameters from the exemplar promotional price tag heuristic descriptions, acquiring multiple shelf images at a retail store, analyzing the acquired shelf images to recognize barcodes, extracting heuristic attributes from the acquired shelf images, determining whether a recognized barcode is part of a promotional price tag and reporting missing or invalid promotional price tags.

Extracting heuristic descriptions from exemplar promotional price tags comprises displaying at least one selected exemplar promotional price tag from the retail store and prompting an operator to identify at least two heuristic elements of the selected exemplar promotional price tag. One of the heuristic elements is a barcode element and the other heuristic elements are non-barcode elements.

If multiple exemplar promotional price tags are displayed, extracting heuristic descriptions of exemplar promotional price tags also comprises 1) prompting an operator to select one of the displayed exemplar promotional price tags, 2) prompting the operator to identify at least two heuristic elements of the selected exemplar promotional price tag, and 3) repeating steps 1 and 2 until each of the displayed exemplar promotional price tags has been selected.

Alternatively, extracting heuristic descriptions of exemplar promotional price tags may comprise prompting the operator to confirm that the exemplar promotional price tags not selected in step 3 include all of the heuristic elements identified in step 2.

Extracting heuristic descriptions from exemplar promotional price tags also comprises combining and merging the identified heuristic elements into a single set of promotional price tag descriptions.

Deriving heuristic parameters from the exemplar promotional price tag heuristic descriptions comprises measuring the size of the barcode of the selected exemplar promotional price tag in pixels, computing baseline scores for the non-barcode heuristic elements, aggregating the baseline scores of the non-barcode heuristic elements to produce an overall baseline score, and publishing the overall baseline score.

Computing baseline scores for the non-barcode heuristic elements comprises detecting attributes of the non-barcode heuristic element, measuring the detected attributes of the non-barcode heuristic element, and determining a baseline score for the non-barcode heuristic element based on the measured detected attributes.

If the non-barcode heuristic element is color patch, detecting attributes of the non-barcode heuristic element includes performing a color patch detection on the selected exemplar promotional price tag, and measuring the detected attributes includes at least one of measuring size, measuring aspect-ratio, measuring fill-factor, or measuring position relative to the barcode.

If the non-barcode heuristic element is number, detecting attributes of the non-barcode heuristic element includes performing a digit detection on the selected exemplar promotional price tag, and measuring the detected attributes includes at least one of measuring size, or measuring position relative to the barcode.

If the non-barcode heuristic element is text, detecting attributes of the non-barcode heuristic element includes performing a text detection on the selected exemplar promotional price tag, and measuring the detected attributes includes at least one of measuring size, measuring similarity to an ideal text, or measuring position relative to the barcode.

If the non-barcode heuristic element is logo, detecting attributes of the non-barcode heuristic element includes performing a logo detection on the selected exemplar promotional price tag, and measuring the detected attributes includes at least one of measuring size, measuring similarity to an ideal logo, or measuring position relative to the barcode.

Analyzing the acquired shelf images comprises selecting one of the acquired shelf images, analyzing the selected acquired shelf image, and determining if a barcode is present in the selected acquired shelf image by localizing and recognizing the barcode.

Extracting heuristic attributes from the acquired shelf images comprises extracting heuristic attributes from at least one portion of the selected acquired shelf image and determining whether or not the recognized barcode is part of a promotional price tag.

Extracting heuristic attributes from the acquired shelf images also comprises producing a sub-image from the acquired shelf image, comparing heuristic elements of the sub-image to heuristic elements of the exemplar promotional price tags, and determining if the sub-image includes a promotional price tag.

Producing a sub-image from the acquired shelf image includes measuring a size of the selected barcode in pixels and cropping a portion of the acquired image to produce a sub-image.

Extracting heuristic attributes from the acquired shelf images also comprises measuring the size of the barcode of the sub-image in pixels, computing sample scores for the non-barcode heuristic elements, aggregating the sample scores of the non-barcode heuristic elements to produce an overall sample score, publishing the overall sample score and comparing the overall sample score to the overall baseline score to determine if the sub-image includes a promotional price tag.

Computing sample scores for the non-barcode heuristic elements comprises detecting attributes of the non-barcode heuristic element, measuring the detected attributes of the non-barcode heuristic element, and determining a sample score for the non-barcode heuristic element based on the measured detected attributes.

If the non-barcode heuristic element is color patch, detecting attributes of the non-barcode heuristic element includes performing a color patch detection on the sub-image, and measuring the detected attributes includes at least one of measuring size, measuring aspect-ratio, measuring fill-factor, or measuring position relative to the barcode.

If the non-barcode heuristic element is number, detecting attributes of the non-barcode heuristic element includes performing a digit detection on the sub-image, and measuring the detected attributes includes at least one of measuring size, or measuring position relative to the barcode.

If the non-barcode heuristic element is text, detecting attributes of the non-barcode heuristic element includes performing a text detection on the sub-image, and measuring the detected attributes includes at least one of measuring size, measuring similarity to an ideal text, or measuring position relative to the barcode.

If the non-barcode heuristic element is logo, detecting attributes of the non-barcode heuristic element includes performing a logo detection on the sub-image, and measuring the detected attributes includes at least one of measuring size, measuring similarity to an ideal logo, or measuring position relative to the barcode.

Extracting heuristic attributes from the acquired shelf images may comprise extracting heuristic attributes from at least one portion of the selected acquired shelf image, determining whether or not the recognized barcode is adjacent to a border of the acquired image, measuring the recognized barcode's distance from the border of the acquired image if the recognized barcode is adjacent to a border of the acquired image, and adjusting the overall baseline score based on the recognized barcode's measured distance from the border of the acquired image.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 5:
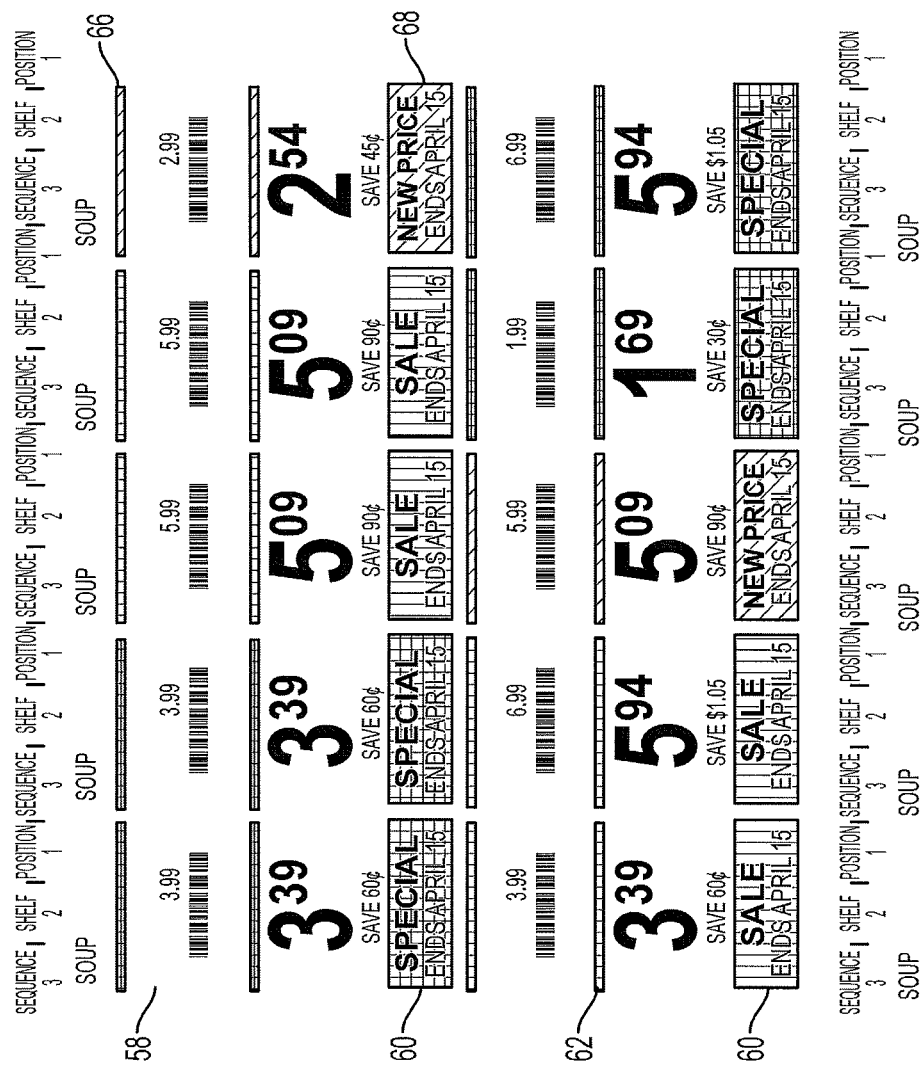
FIG. 5 is illustrates exemplary promotional price tags having various promotional price tag elements.

With reference to the drawings wherein like numerals represent like parts throughout the several figures, a system for retail store promotional price tag detection and maintenance via heuristic classifiers in accordance with the present disclosure is generally designated by the numeral 10. The system utilizes image-based and/or video-based analytics to detect promotional price tags/signage (PPTs) 8. Promotional price tags are hereby defined to be signage designed to be human-read, used to temporarily promote the sale of an item and containing at least one of the following: a barcode (any machine-readable image with a relatively high accuracy rate compared to optical character recognition), a color patch, a number (e.g. price), and text. See FIG. 5. PPTs 8 are generally used by retail stores selling to the public to attract the buyers' attention to specific goods that are the subject of promotional marketing. However, "retail store" is hereby defined to include any retail or wholesale location utilizing PPTs 8. This information may be used to improve the retail store management: resource and efficiency, by checking invalid PPTs (e.g. missing or out-of-date PPTs) and providing the location of any such PPTs. The matching or detection required for this system must be accomplished using higher level attributes since there are both static and variable elements in the PPTs 8.

Figure 1:
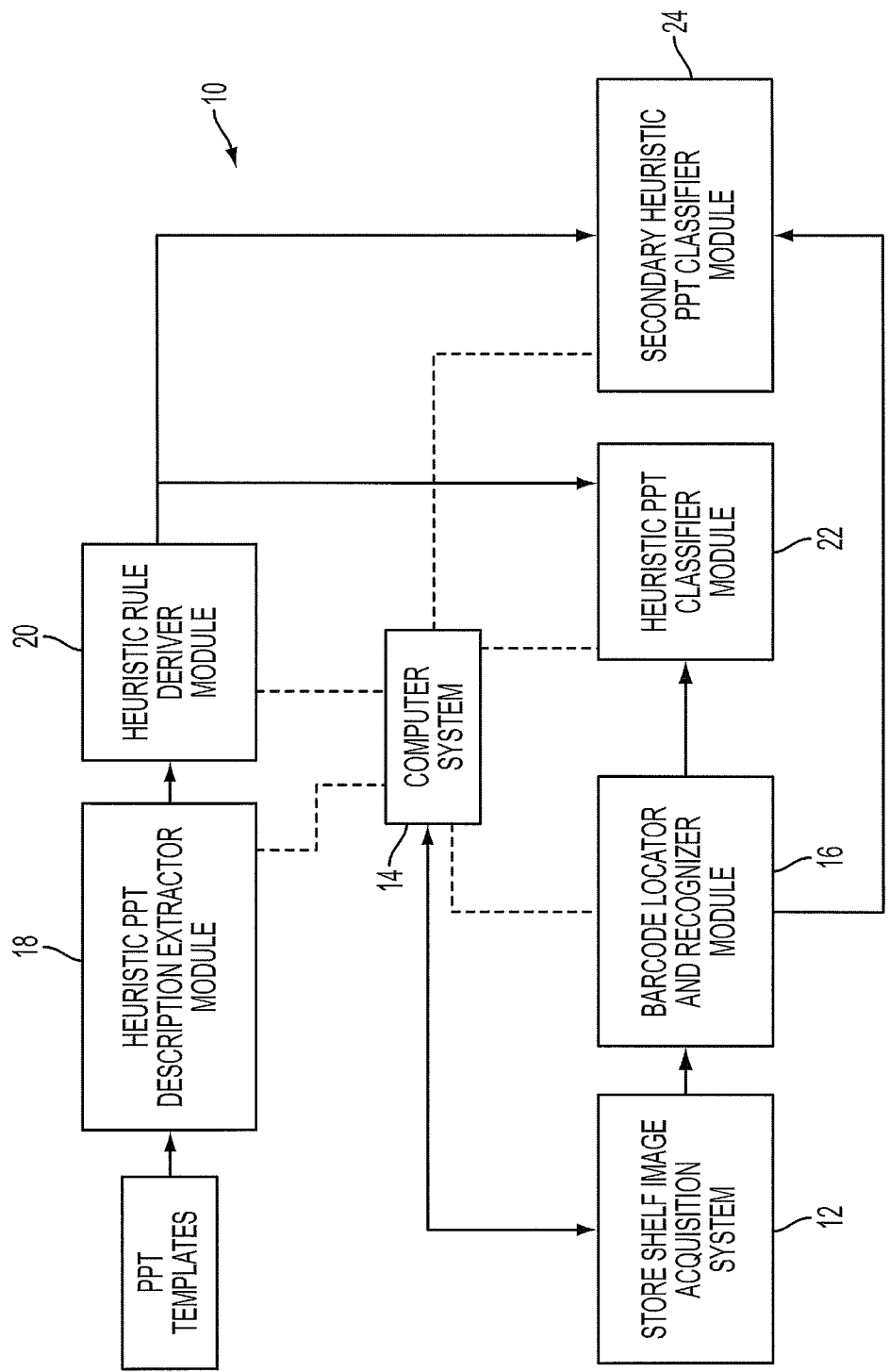
FIG. 1 is functional block diagram of a system for retail store promotional price tag detection and maintenance in accordance with the present disclosure.
Figure 2:
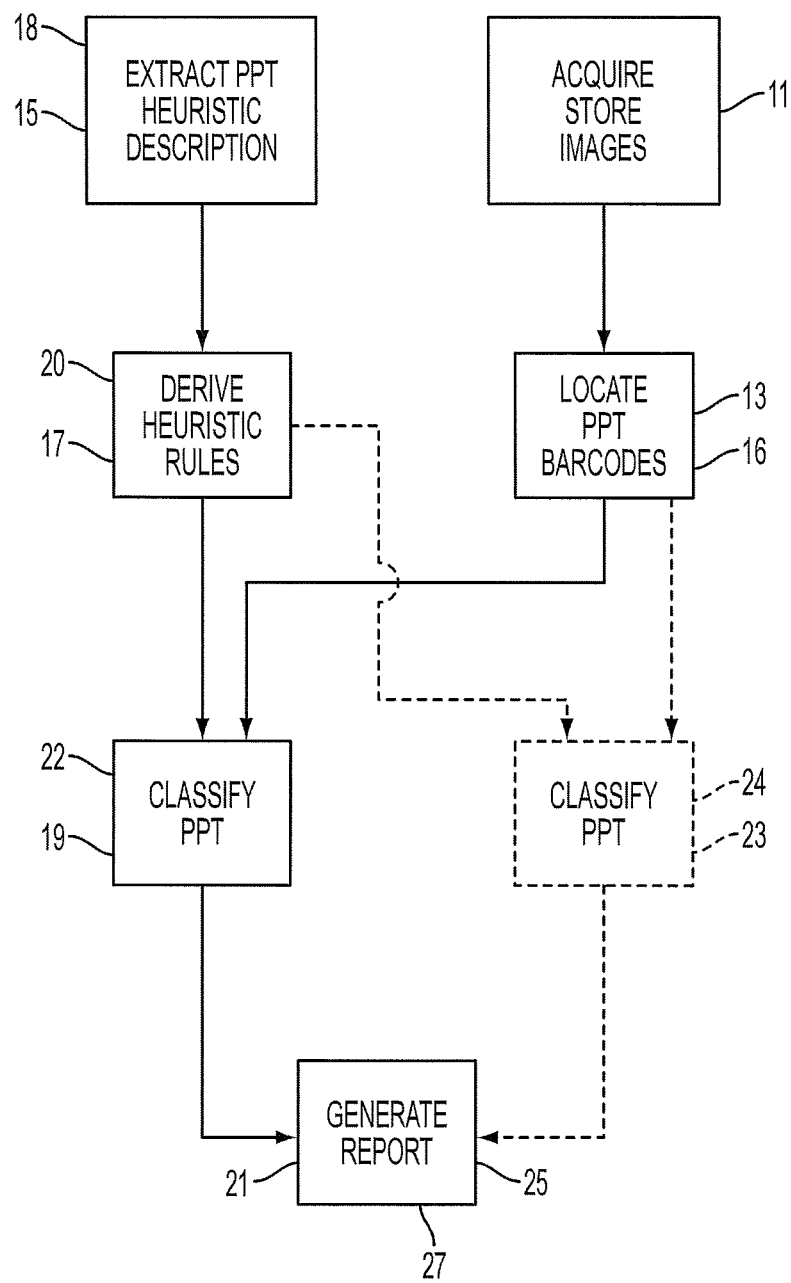
FIG. 2 is a flow diagram of a method of retail store promotional price tag detection and maintenance in accordance with the present disclosure.

With reference to FIGS. 1 and 2, the system 10 includes a store shelf image acquisition system 12, a computer system 14, a barcode locator and recognizer module 16, a heuristic promotional price tag description extractor module 18, a heuristic rule deriver module 20 and a heuristic promotional price tag classifier module 22. The heuristic promotional price tag description extractor module 18 extracts 15 heuristic descriptions of exemplar promotional price tags 8. The heuristic rule deriver module 20 derives 17 heuristic parameters that are useful in classifying PPTs. The store shelf image acquisition system 12 acquires 11 shelf images for promotional price tag detection and maintenance, and may also acquire shelf images for barcode localization and recognition. The barcode locator and recognizer module 16 analyzes full acquired images or portions of acquired images to locate 13 and recognize barcodes. The heuristic promotional price tag classifier module 22 extracts heuristic attributes from portions of the acquired images and classifies 19 whether a localized and/or recognized barcode is part of a promotional price tag 8 based on the set of promotional price tag parameters supplied by the heuristic rule deriver module 20. The PPTs 8 identified by the heuristic promotional price tag classifier module 22 may then be compiled in a database and/or compared to a database of PPTs 8 that supposed to be present within the store. A report is generated 21 listing missing or out-of-date PPTs 8 and their locations. The out-of-date PPTs 8 are removed 25 and the missing PPTs 8 replaced 27.

The system 10 may also include a secondary heuristic promotional price tag classifier module 24, which classifies 23 whether a localized and/or recognized barcode is part of a promotional price tag 8 based on a subset of the classification task of the primary classifier 22 or an alternative set of heuristic rules for the classification task for predefined imaging condition/area. It should be appreciated that although the secondary heuristic promotional price tag classifier module 24 would provide results faster than heuristic promotional price tag classifier module 22, the results should have a lower confidence level.

Figure 3A:
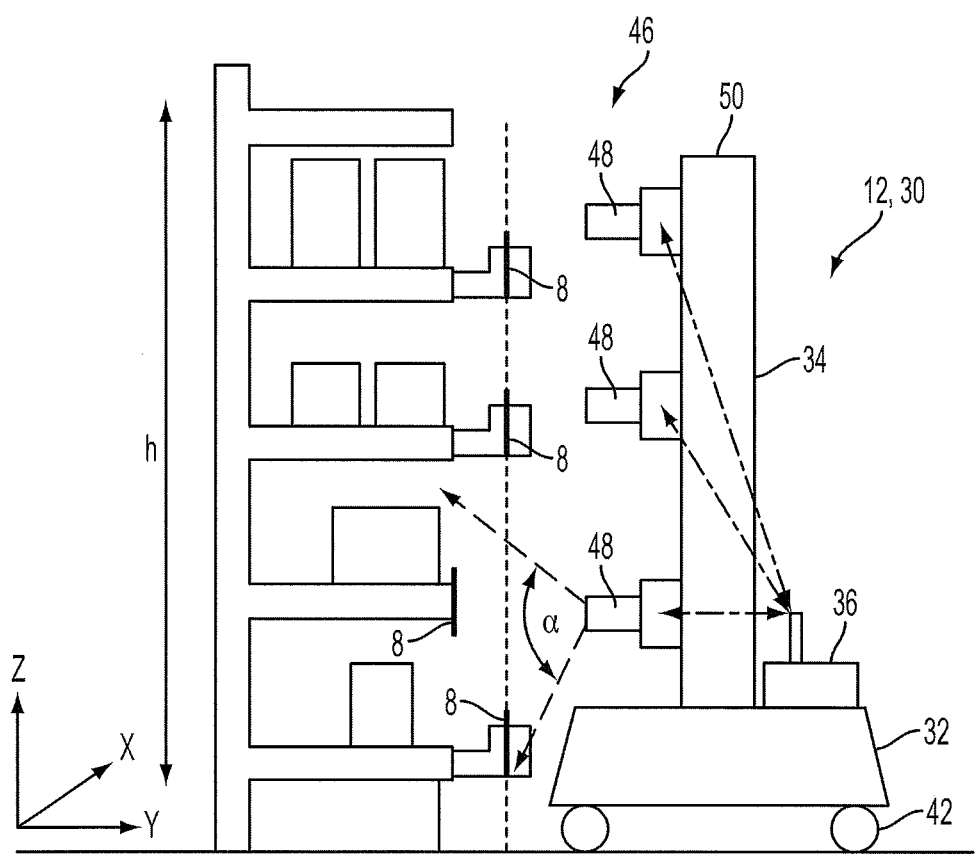
FIG. 3A is a schematic elevational view of a store shelf imager in accordance with one aspect of the exemplary embodiment.
Figure 3B:
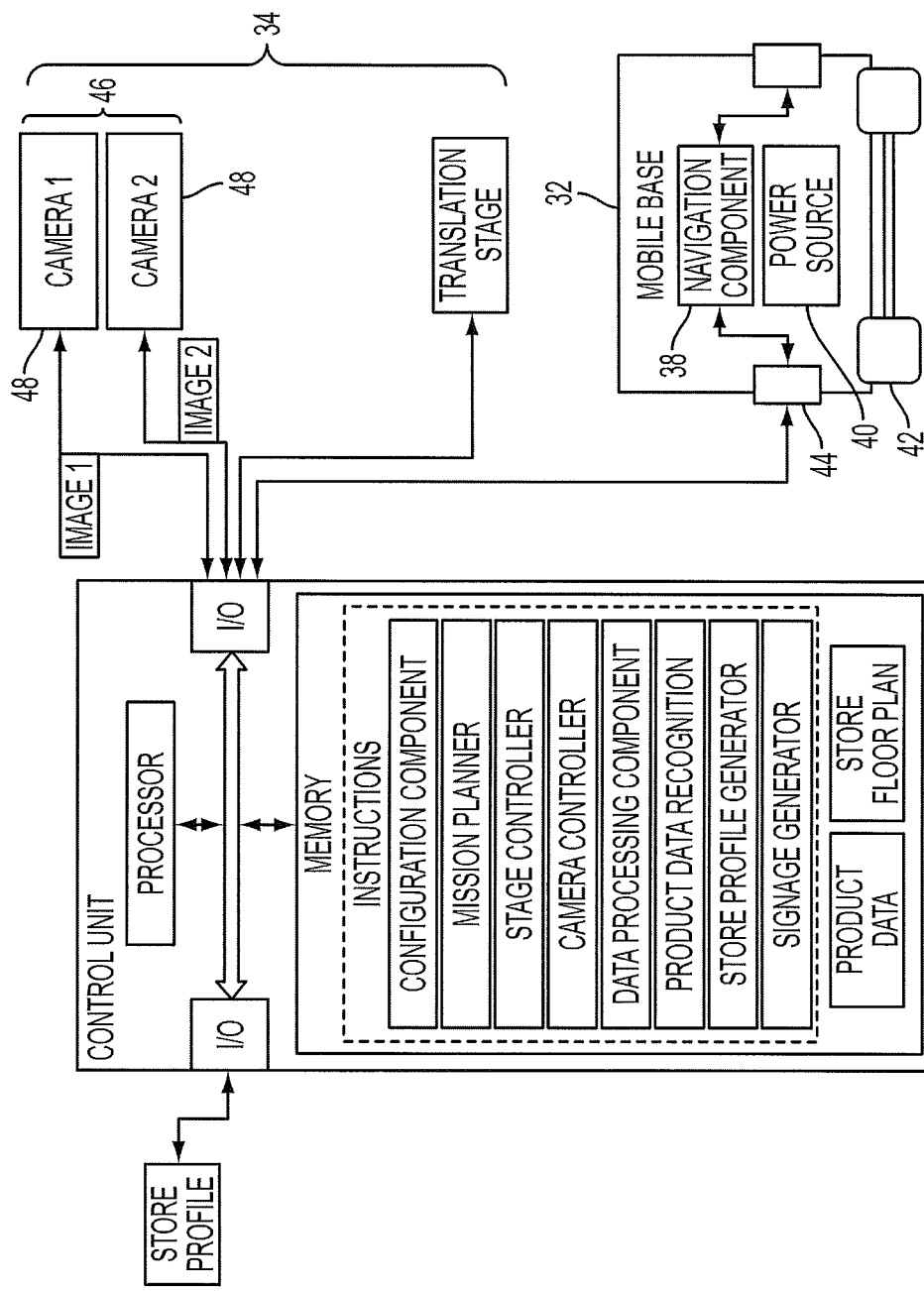
FIG. 3B is a functional block diagram of a store profile generation system in accordance with one aspect of the exemplary embodiment.

The store shelf image acquisition system 12 acquires product shelf images, which are further analyzed for barcode localization and recognition and for promotional price tag detection. With reference to FIGS. 3A and 3B, an example of a store shelf image acquisition system 12 is a store shelf imager 30 of the type disclosed in U.S. patent application Ser. No. 14/303,809, filed Jun. 13, 2014. The store shelf imager 30 includes a mobile base 32, an image capture assembly 34, and a control unit 36, which are moveable as a unit around the retail location. The store shelf imager 30 captures images with the image capture assembly 34 at a sequence of locations within the store. The mobile base 32 serves to transport the image capture assembly 34 around the store and may be fully-autonomous or semi-autonomous.

In an autonomous mode, the motorized mobile base 32 may include a navigation component 38 and an associated power source 40, such as a battery, motor, drive train, etc., to drive wheels 42 of the mobile base in order to move the imager 30 to a desired location. The navigation component 38 may be similarly configured to the control unit 36 and may include memory and a processor for implementing the instructions provided by the control unit. Position and/or motion sensors 44 may be used by the navigation component 38 for identifying the location, orientation, and movement of the mobile base for navigation and for store profile generation by the control unit.

In a semi-autonomous mode, the mobile base 32 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation.

The image capture assembly 34 includes an imaging component 46 which includes one or more image capture devices, such as digital cameras 48, that are carried by a support frame 50. The cameras are configured to capture images of a full height h of the shelf unit, or at least that portion of the height h in which the labels of interest are likely to be positioned throughout the facility. One or more of the camera(s) 48 may be moveable, by a suitable mechanism, in one or more directions, relative to the support frame 50 and/or mobile base 32. The cameras 48, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction; the zoom capability increases/decreases the field of view in the x, z plane. The image capture assembly 34 serves to capture a series of images containing PPTs 8 at sufficient resolution for analysis and recognition.

Figure 4A:
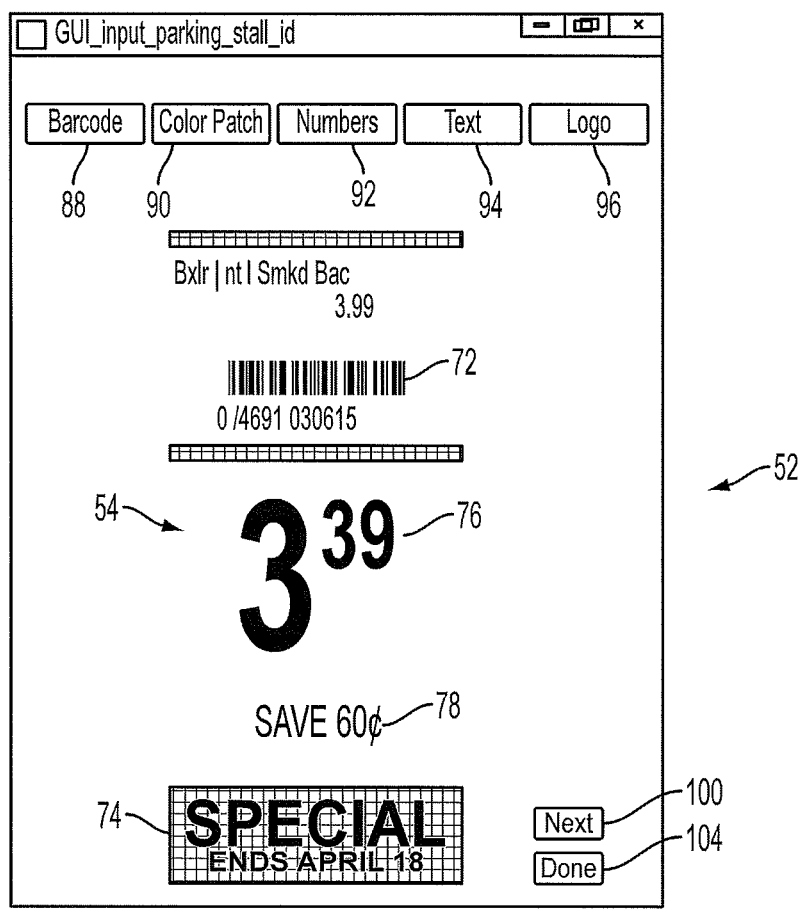
FIG. 4A illustrates a graphical user interface in accordance with one aspect of the exemplary embodiment.

The heuristic promotional price tag description extractor module 18 extracts heuristic descriptions of PPTs 8, which can later be used to derive heuristic rules and parameters for detecting PPTs 8. Generally, many different heuristic descriptions can be extracted from an image. with different human operators extracting different attributes. The heuristic promotional price tag description extractor module 18 removes the variations produced by this human factor, to yield a more predictable and relevant attributes without the need of skilled operators, by utilizing pre-categorized image elements of possible PPTs 8. A graphical user interface (GUI) 52, see FIG. 4A, is used to facilitate the use of unskilled operators. The GUI 52 displays an example of a promotional price tag (PPT) 8 to guide unskilled operators selecting pre-categorized attributes. Optionally, the GUI 52 may also display a regular price tag 54 alongside the PPT 8 to provide guidance of what are good "differentiating" attributes that should be selected. Alternatively, the GUI 52 can include defined attributes for both regular price tags 54 and PPTs 8 and then automatically select "differentiating" attributes based on image analyses.

With reference to FIGS. 4A, 4B, 5 and 6, the heuristic promotional price tag description extractor module 18 starts by displaying 56 a set of example PPTs 8 for a given store (chain). PPT heuristic parameters/elements are hereby defined to be elements of a PPT that are observable by the human eye and a heuristic description for a PPT template is defined by the PPT heuristic parameters that are common to a group of exemplar PPTs. In the example shown in FIGS. 4A and 4B, the PPTs include a barcode 72, a color patch 74, a number 76 and text 78. While the PPTs shown in FIG. 5 also include all of these heuristic parameters, it is clear that there are three possible high-level PPT templates for that store whose spatial layout are the same: 1) special items with yellow lines 58 and patch 60; 2) sale items with red lines 62 and patch 64; and 3) new price items with green lines 66 and patch 68. Accordingly, the PPT heuristic description could be limited by specifying a specific color for the color patch or expanded by specifying the presence of any color patch.

The module prompts 70 the operator to select a PPT 8 such that the selected element is displayed in the GUI as shown in FIG. 4A. In the example of FIG. 4A, image elements are pre-categorized into five categories: barcode 72, color patch 74, number 76, text 78, and logo (not shown).

Figure 4B:
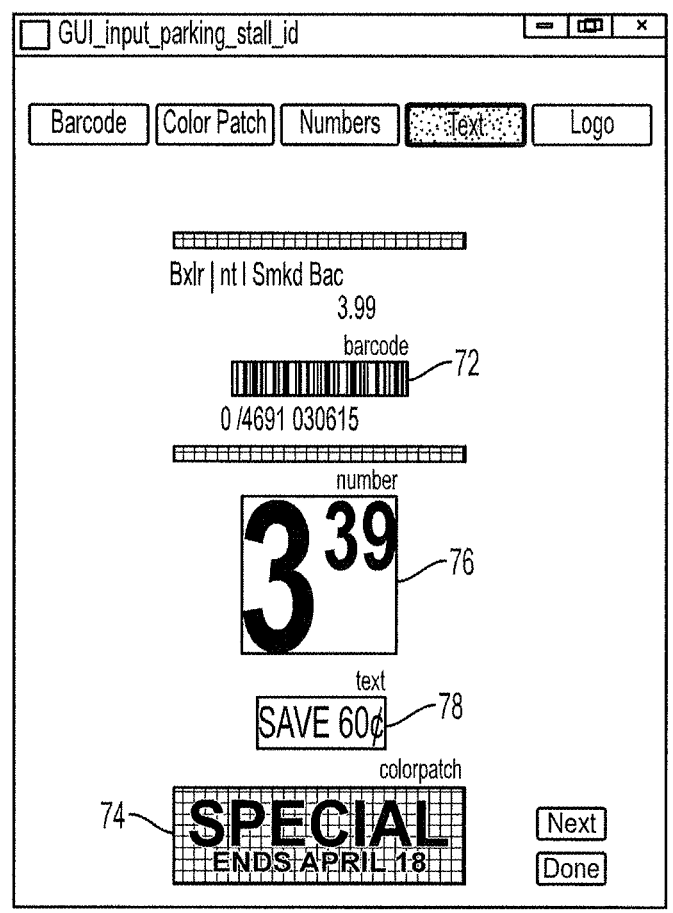
FIG. 4B illustrates promotional price tag elements selected on the graphical user interface of FIG. 4A.
Figure 6:
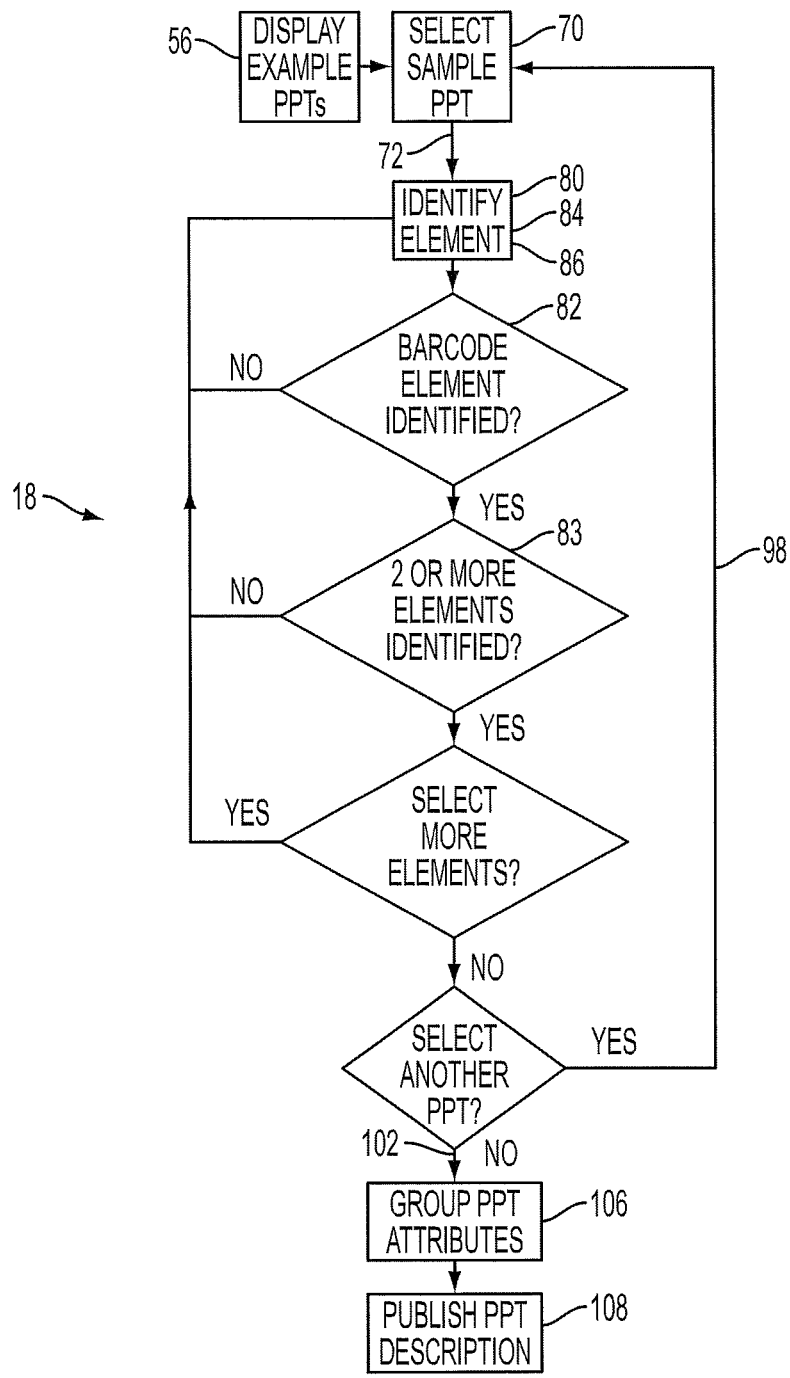
FIG. 6 is a flow diagram of a heuristic promotional price tag description extractor module in accordance with one aspect of the exemplary embodiment.

With additional reference to FIG. 6, the module 18 requires the operator to identify 80 at least two of the image elements, including at least one barcode element 82, as the classifier is barcode-centric, and at least one element 83 other than barcode. The operator identifies 80 the selected elements by clicking 84 on the displayed element and clicking 86 on the appropriate category button 88, 90, 92, 94, 96. As the selection process progresses, the display provides an update of what elements have been identified. FIG. 4B shows an example display after the operator defined 4 elements. The operator only needs to roughly identify the region of each element. An imaging processing subroutine fine-tunes the selection to the exact pixel location based on edges and colors. Another image processing subroutine extracts relevant features/attributes of the selected element based on the category selected. Once the operator feels that the template of a PPT is done, he/she can click on "Next" to do another PPT 8 or click on "Done" to finish.

For the store in the example, the operator specified the barcode element 72, the color patch element 71 (yellow bar with "special"), the number element 76 (339) and the text element 78 (save 60¢). The GUI 52 would still operate properly even if the operator does not recognize that for the exemplary store the PPT heuristic description is defined by three elements. The operator may be asked to process all of the PPTs 8 (10 in FIG. 5). Alternatively, if the layout of all the PPTs 8 are roughly the same, the operator would only need to specify one PPT 8 in detail and confirm the rest. A grouping subroutine automatically combines and merges 106 extracted PPT descriptions/attributes into a single set of PPT descriptions 108 that can be used to derive the heuristics rules and parameters for PPT classification. Table 1 shows the published PPT descriptions for the PPTs 8 of the example store.

TABLE 1

*** Store promotional price tag description ***
Comments:
  relative size is relative to the width of the barcode
  relative location is upper-left corner of element relative to upper-left corner of barcode in pixels
  color is in (G,R/(R+G+B),G/(R+G+B))
Description:
  Number of distinct templates: 3
  Number of distinct layout: 1
  Promotional price tag: relative location = (−189,−132), relative size = (2.752,1.755), color = (255,0.33,0.33)
  Barcode: relative location = (0,0), absolute size = (64,339)
  Color patch: relative location = (574,−111), relative size = (0.451,1.640) color = [(242,0.51,0.49) (58,0.66,0.16)

TABLE 1-continued (183,0.23,0.55))] patch fraction = [ 0.79 0.78 0.73 }
Number: 3-digit relative location = (182,25), relative size = (0.855,0.858) relative character height= {0.395 0.189 0.186}
Number: 7-characters relative location = (493,51), relative size = (0.180,0.681) relative character height = (0.083 0.103 0.097 0.077 0.071 0.071]
Logo: none
*** End of promotional price tag description ***

Figure 7:
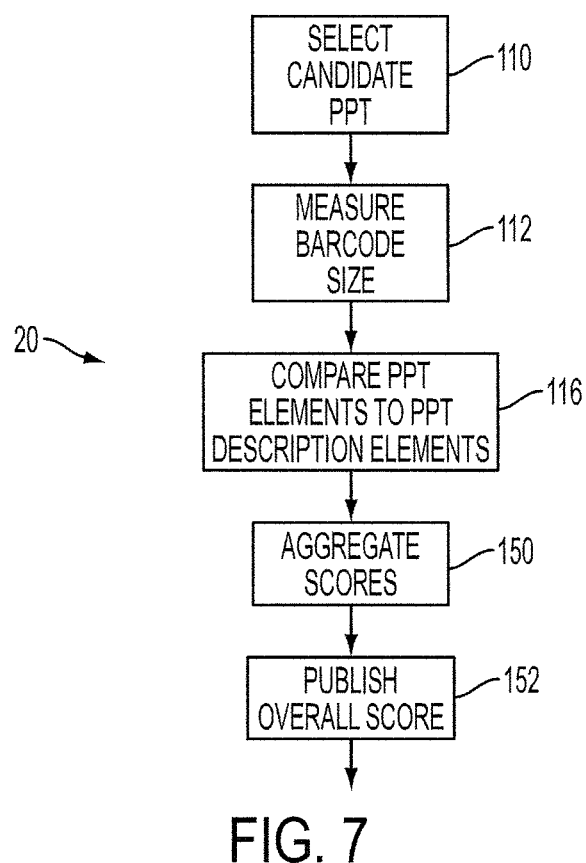
FIG. 7 is a flow diagram of a heuristic rule deriver module in accordance with one aspect of the exemplary embodiment.
Figure 8:
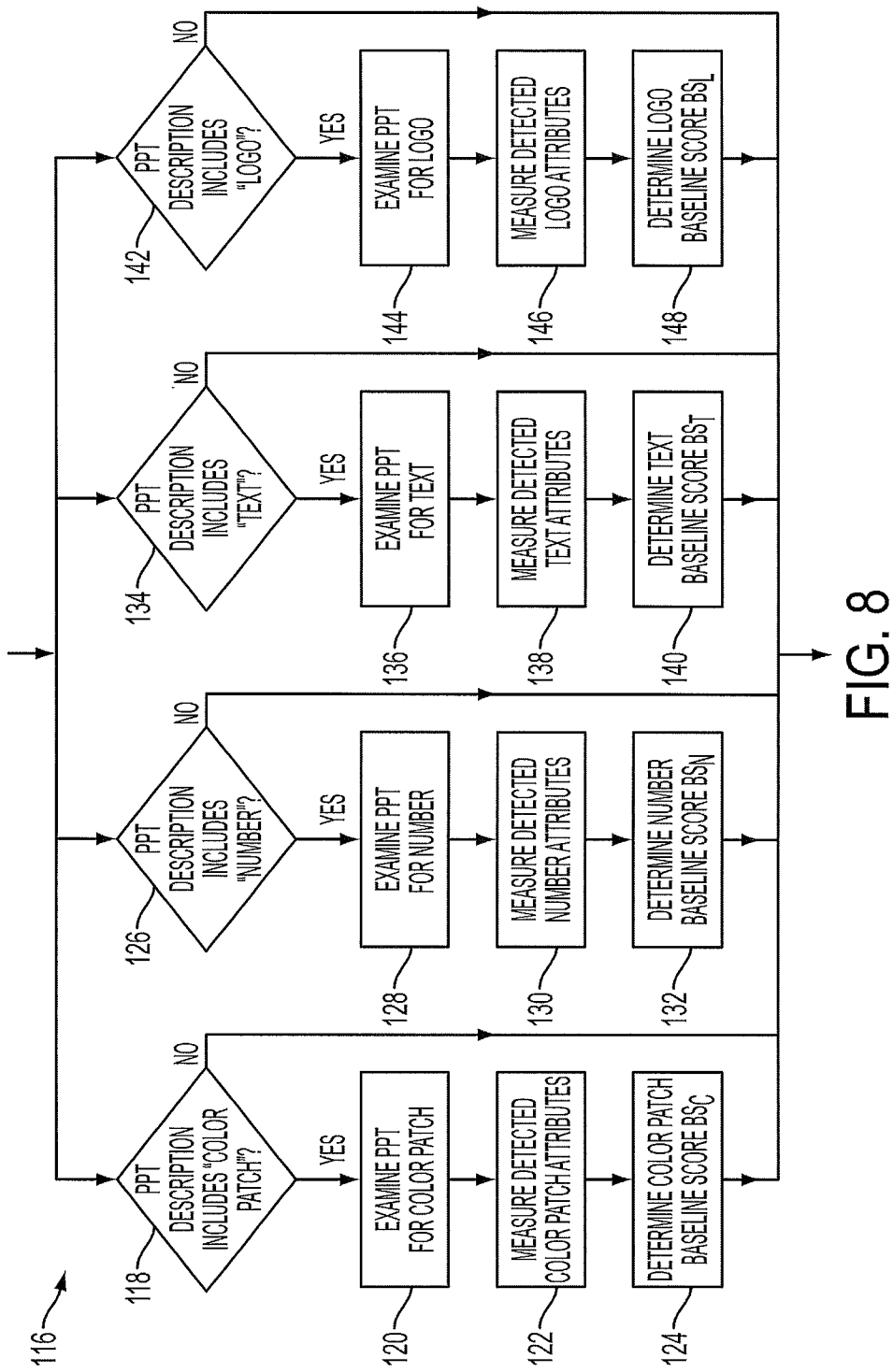
FIG. 8 is a flow diagram of the compare PPT elements to PPT description elements step of FIG. 7.

With reference to FIGS. 7 and 8, the heuristic rule deriver module 20 derives useful parameters to be used by heuristic classifiers for PPT detection/classification. Following the same concept of the heuristic promotional price tag description extractor module 18, the heuristic rule deriver module 20 automatically measures and derives useful parameters for the classifiers. This is plausible via for example the use of pre-categorized image elements of possible PPTs 8 in the descriptor facilitates operation of the module 20.

The following is one example heuristic rule deriver module 20:

1) Select 110 one of the example PPTs 8.
2) Measure 112 size of the barcode on the example PPT 8 in pixels.
3) Examine 116 the non-barcode PPT elements listed in the published PPT description.
  a) If the PPT description includes "color patch" 118, perform a color patch detection 120 on the example PPT 8, measure 122 the detected attributes (e.g., size, aspect-ratio, fill-factor, position relative to the barcode) of the color patch, and determine 124 a baseline score, $BS_C$.
  b) If the PPT description includes "Number" 126, perform a digit detection 128 on the example PPT 8, measure 130 the detected attributes (e.g., size, position relative to the barcode, . . . ) of the "number", and determine 132 a baseline score, $BS_N$. The matching criterion can be as simple the size of each digit and the number of them. There is no need to use optical character recognition (OCR) engine.
  c) If the PPT description includes "Text" 134, perform a text detection 136 on the example PPT 8, measure 138 the detected attributes (e.g., size, similarity to the ideal text, position relative to the barcode, . . . ) of the "Text", and determine 140 a baseline score, $BS_T$. The matching criterion can be as simple the height of each character and the number of them or an overall size of a block of text. There is no need to use optical character recognition (OCR) engine.
  d) If the PPT description includes "logo" 142, perform a logo detection 144 on the example PPT 8, measure 146 the detected attributes (e.g., size, similarity to the ideal logo, position relative to the barcode, . . . ) of the logo, and determine 148 a baseline score, $BS_L$.
4) Aggregate 150 the baseline scores, ($S_C$, $S_N$, $S_T$, $S_L$), to yield 152 an overall baseline score BS.

This set of rules is very generic and can be applied to most PPTs 8 in retail stores. In addition, this module 20 would also derive or specify the parameters to execute the rules above (i.e., what is considered a "color patch", what should be a suitable "number" or "text", what are acceptable sizes or relative positions to the barcode, . . . ). The derivation of the parameters may be based on repeating the analysis of the above rule on exemplar PPTs that are available. The specification of the parameters may be based on knowledge of the manufacture of the PPTs (e.g. expected printing noise or color shifts) or knowledge of the image acquisition conditions of the store (e.g. expected lighting of the store, expected color shift from the imaging system). For example, a wider color tolerance may be specified for the color range of color patches if the imaging system has exceptional color noise.

An example set of derived parameters are shown in Table 2, which is derived from the extracted data in Table 1. For cropping sub-images, relative location and relative size are used as-is to crop of the sub-images for further analyses. All units are scaled based on the width of the barcode 72 (which is more robust than the height of the barcode for these particular PPT templates). For color detection, only hue may be used and set a ±0.1 allowable variation. The location of the color patch 74 may be constrained to be below the barcode 72, with 50% error or less of the expected size and the fraction of color pixels has to be higher than 0.5 (the expected value is 0.73-0.78 from analyzed templates). Color patch detection typically requires more rules since in the retail environment, there are many distractors coming from the colorful packaging of the actual products. With the barcode-centric approach utilized herein, accuracy and robustness are improved greatly since the search is limited locally. For number 76 and text 78, it is preferable to examine only high level attributes such as the number characters or digits and the height.

ing barcode recognition in the system 10 provides almost 100% assurance of detecting a PPT 8 when a barcode 72 is detected and recognized. This level of assurance greatly reduces the region that must be searched for matching the PPT templates and improves the robustness of the classifier. Unfortunately, in the unlikely event that a barcode 72 is not detected the system 10 is unlikely to recognize the PPT 8 immediately.

Figure 10:
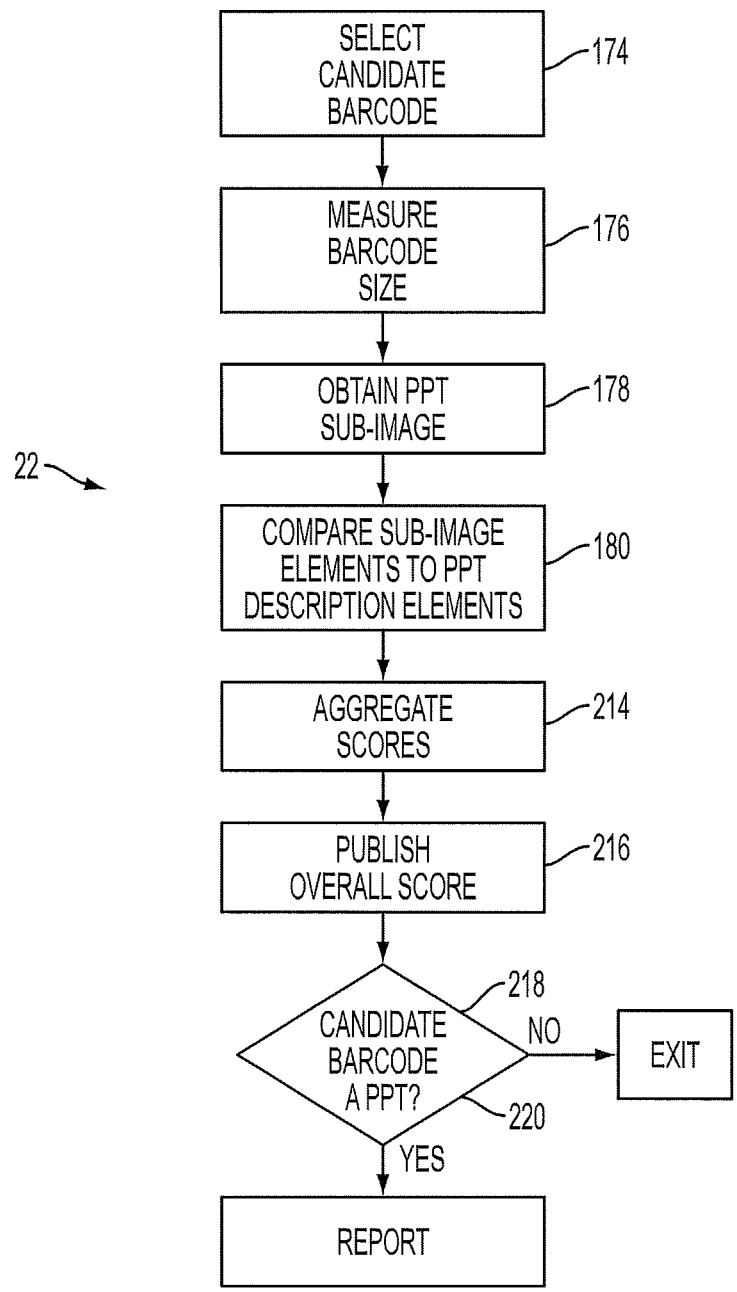
FIG. 10 is a flow diagram of a heuristic promotional price tag classifier module in accordance with one aspect of the exemplary embodiment.

With reference to FIG. 10, the heuristic promotional price tag classifier module 22 extracts heuristic attributes from portions of the acquired images and determines whether a localized and/or recognized barcode is part of a promotional price tag 8 or not. In effect, this module executes the heuristics rules generated from the heuristic rule deriver module 20 using the attributes in the PPT description 108 published by the heuristic promotional price tag description extractor module 18.

The following is one example heuristic promotional price tag classifier module 22:

1) Select 174 a localized candidate barcode 72 or a localized and recognized barcode from barcode locator and recognizer module 16.
2) Measure 176 barcode size in pixels and then use the heuristic PPT description regarding the relative posi-

TABLE 2

| Category | Parameters | Purpose |
|---|---|---|
| Promotional price tag | relative location = (−189, −132), relative size = (2.752, 1.755) | Crop out sub-image where the PPT may be based on the detected barcode location and width. All remaining processing will be limited to this sub-image (search is simplified) |
| Color patch | hue R/(R + G + B), G/(R + G + B) is within 0.1 of 3 possible colors | Detect potential color patches that is similar to the hue of one of the three patches |
| Color patch | hue R/(R + G + B), G/(R + G + B) is NOT within 0.1 of neutral (⅓, ⅓) | Detect non-neutral color patches that could be part of PPT (complementary rule of above) |
| Color patch | relative location is blow the barcode | Detect potential color patches that is located below the location of the barcode |
| Color patch | relative size is with 50% error of expected size | Detect potential color patches that is about the expected size |
| Color patch | color patch fraction is 0.5 or more | Detect potential color patches that has sufficient fraction of color pixel expected (expected value is 0.73~0.78) |
| Number | relative location = (182, 25), relative size = (0.855, 0.858) | Crop out a sub-image within the PPT sub-image that contain the number set (price) |
| Number | 3-digit or more relative character height = {0.395 0.189 0.186} ± 0.1 | Check if the price number block make senses |
| Text | relative location = (493, 51), relative size = (0.180, 0.681) | Crop out a sub-image within the PPT sub-image that contain the text set |
| Text | 6-characters or more relative character height = 0.1 ± 0.05 | Check if the text block make senses |

Figure 9:
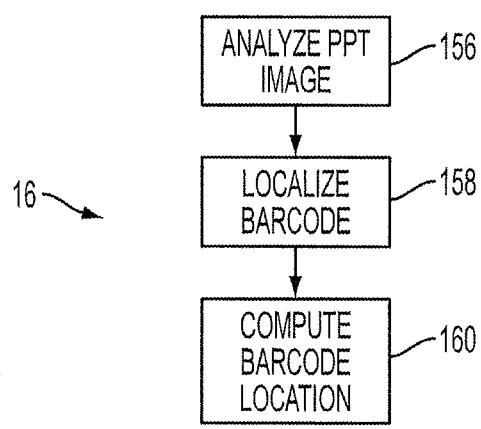
FIG. 9 is a flow diagram of a barcode locator and recognizer module in accordance with one aspect of the exemplary embodiment.

With reference to FIG. 9, the barcode locator and recognizer module 16 analyzes 156 full acquired images or portions of acquired images to localize 158 and recognize barcodes. It also utilizes the reported location and pose information of the imager 30 and position/orientation of the imaging component 46 to convert 160 pixel location of the recognized barcode 72 into real-world store coordinates. The barcode locator and recognizer module 16 provides a barcode-centric heuristic classifier for promotional price tag detection, i.e., all or most of the heuristic rules and parameters are centered around the barcode. Experimental data shows that candidate barcodes 72 can be easily detected with low-level image processing such as edge strengths. Includtion and PPT size to crop 178 a portion of the acquired image to get a sub-image for classification.
3) Compare 180 the PPT elements within the sub-image to PPT elements listed in the published PPT description.
   a) If the PPT description includes "color patch" 182, perform a color patch detection 184 within the sub-image, measure 186 the detected attributes (e.g., size, aspect-ratio, fill-factor, position relative to the barcode) of the color patch, and determine 188 a score, $S_C$, representing the confidence that the detected color patch matches the color patch PPT description.

b) If the PPT description includes "Number" 190, perform a digit detection 1192 within the sub-image, measure 194 the detected attributes (e.g., size, position relative to the barcode, . . . ) of the "number", and determine 196 a score, $S_N$, representing the confidence that the detected Number matches the Number PPT description. The matching criterion can be as simple the size of each digit and the number of them. There is no need to use optical character recognition (OCR) engine.

c) If the PPT description includes "Text" 198, perform a text detection 200 within the sub-image, measure 202 the detected attributes (e.g., size, similarity to the idea text, position relative to the barcode, . . . ) of the "Text", and determine 204 a score, $S_T$, representing the confidence that the detected text matches the text PPT description. The matching criterion can be as simple the height of each character and the number of them or an overall size of a block of text. There is no need to use optical character recognition (OCR) engine.

d) If the PPT description includes "logo" 206, perform a logo detection 208 within the sub-image, measure 210 the detected attributes (e.g., size, similarity to the idea logo, position relative to the barcode, . . . ) of the logo, and determine 212 a score, $S_L$, representing the confidence that the detected logo matches the logo PPT description.

4) Aggregate 214 the matching scores, ($S_C$, $S_N$, $S_T$, $S_L$), to yield 216 an overall score S and compared 218 to the overall baseline score BS to determine 220 whether the sub-image resembles a PPT 8 and thus determine whether the given candidate barcode (if localized candidate barcode is used in the beginning) or given recognized barcode (if localized and recognized barcode is used in the beginning) is indeed a PPT 8.

Figure 11:
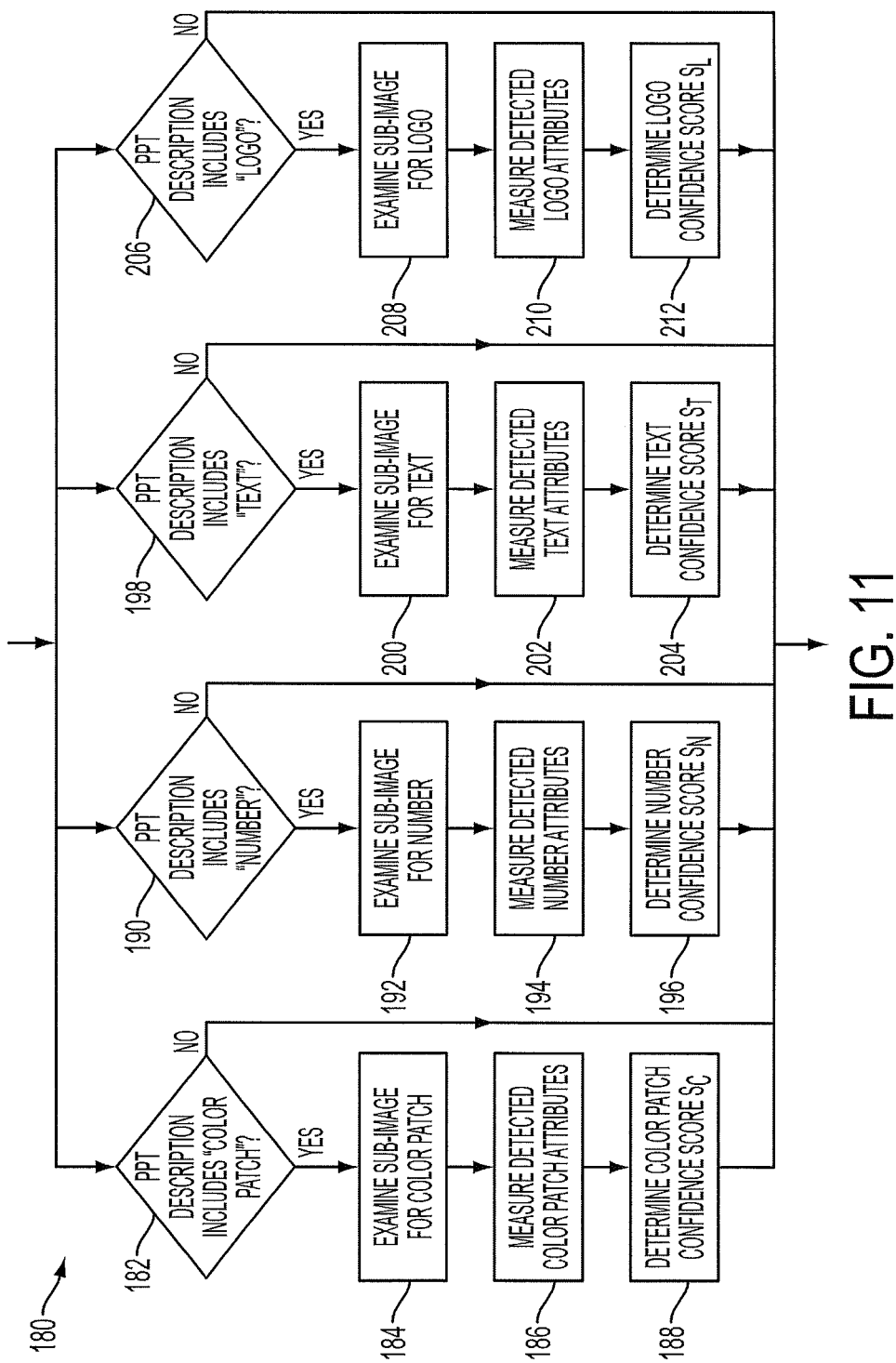
FIG. 11 is a flow diagram of the compare sub-image elements to PPT description elements step of FIG. 10.
Figure 12:
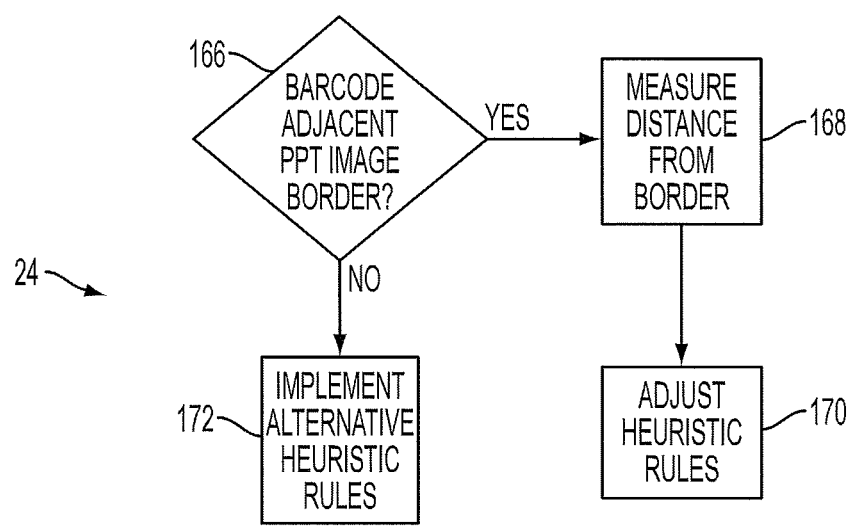
FIG. 12 is a flow diagram of a secondary heuristic promotional price tag classifier module in accordance with one aspect of the exemplary embodiment.

With reference to FIG. 11, the optional secondary heuristic promotional price tag classifier module 24 executes only a subset of classification task of the primary heuristic promotional price tag classifier module 22 or applies an alternative set of heuristic rules for the classification task for predefined imaging condition/area. This module 24 is useful in combination with the store shelf imager 30 described above due to the need of high resolution imaging for barcode recognition and the large camera field of view (FOV) required to view a typical store shelf. The exemplar store shelf imager 30 utilizes three cameras 48 to cover a typical six foot tall store shelf. Each camera 48 acquires a fraction of the FOV with some/minimal overlap among them. As a result, it is possible that a PPT 8 is imaged and split by two acquired images. When this happens, the primary heuristic promotional price tag classifier module 22 likely will not detect the PPT 8 due to the observation of only portion of the image of the PPT 8.

Given this potential failure mode, the secondary heuristic promotional price tag classifier module 24 performs in the following manner. If the localized candidate barcodes or localized and recognized barcodes 72 are adjacent to the border 166 of the acquired images, the heuristic rules and parameters for the secondary heuristic promotional price tag classifier module 24 would be adjusted 170 accordingly based on how far the measured 168 distance is from the border. As an example, the size threshold of the "color patch" 74 may be reduced for this classifier given that it would be expected that the "color patch" 74 may be cut off if near the border of the acquired image. As another example, some "text" element 78 may no longer available due to the same cut off issues. While the secondary heuristic promotional price tag classifier module 24 has a lower confidence level for detection of a PPT 8 compared to the primary heuristic promotional price tag classifier module 22 due to a loss of information, it is useful in the specific situation where primary heuristic promotional price tag classifier module 22 will fail anyway.

Alternative heuristic rules may be implemented 172 for secondary heuristic promotional price tag classifier module 24. For example, the size of the white area around a potential PPT 8, typically on sticker with white background, may be used as a heuristic rule for differentiating PPTs 8 from regular price tags. Regular price tags are usually much smaller than the PPTs 8 and most shelf product packages are colorful rather than white. This makes it possible to simply use the size of white area around a potential PPT 8 as a heuristic rule to detect PPTs 8.

It should be appreciated that while the performance of barcode-centric heuristic classifiers is limited by the quality of the detected barcodes, the system 10 is accurate, efficient and robust in spite of this limitation. It should also be appreciated that the use of a GUI 52, automated generation of rules and parameters based on pre-defined domain knowledge about the retail applications eliminate the need for experts. Experimental results indicate that the overall accuracy of the system 10 is above 95%.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system to detect and maintain retail store promotional price tags comprising:
   a heuristic promotional price tag description extractor module adapted to extract heuristic descriptions of promotional price tags;
   a heuristic rule deriver module in communication with the heuristic promotional price tag description extractor module, the heuristic rule deriver module being adapted to derive a set of promotional price tag parameters;
   a store shelf image acquisition system adapted to acquire shelf images in a retail store;
   a barcode locator and recognizer module in communication with the store shelf image acquisition system, the barcode locator and recognizer module being adapted to analyze images acquired by the store shelf image acquisition system to localize barcodes; and
   a heuristic promotional price tag classifier module in communication with the barcode locator and recognizer module and the heuristic rule deriver module, the heuristic promotional price tag description classifier module being adapted to extract heuristic attributes from the images acquired by the store shelf image acquisition system using the set of promotional price tag parameters supplied by the heuristic rule deriver module.

2. The system to detect and maintain retail store promotional price tags of claim 1 wherein the heuristic promotional price tag classifier module also determines whether a barcode is part of the promotional price tag.

3. The system to detect and maintain retail store promotional price tags of claim 1 wherein the store shelf image acquisition system also acquires shelf images for barcode localization and recognition.

4. The system to detect and maintain retail store promotional price tags of claim 1 further comprising a secondary heuristic promotional price tag classifier module configured to classify whether a barcode is part of a promotional price tag based on an alternative set of heuristic rules supplied by the heuristic rule deriver module.

5. The system to detect and maintain retail store promotional price tags of claim 1 further comprising a secondary heuristic promotional price tag classifier module configured to classify whether a barcode is part of a promotional price tag based on a subset of the set of a classification task of the heuristic promotional price tag classifier module.

6. The system to detect and maintain retail store promotional price tags of claim 1 wherein the store shelf image acquisition system includes:
a mobile base;
an image capture assembly; and
a control unit;
wherein the mobile base, the image capture assembly and the control unit are moveable as a unit around the retail store.

7. The system to detect and maintain retail store promotional price tags of claim 6 wherein the store shelf image acquisition system also includes:
a navigation component; and
a power source.

8. The system to detect and maintain retail store promotional price tags of claim 7 wherein the navigation component is in communication with the control unit and includes:
a memory; and
a processor, the processor implementing instructions transmitted from the control unit.

9. The system to detect and maintain retail store promotional price tags of claim 8 wherein the store shelf image acquisition system further includes:
at least one position sensor; and
at least one motion sensor;
wherein the position sensor and the motion sensor are in communication with the navigation component.

10. The system to detect and maintain retail store promotional price tags of claim 7 wherein the store shelf image acquisition system further includes:
at least one position sensor; or
at least one motion sensor;
wherein the position sensor or the motion sensor is in communication with the navigation component.

11. The system to detect and maintain retail store promotional price tags of claim 6 wherein the image capture assembly includes:
a support frame; and
an imaging component carried by the support frame.

12. The system to detect and maintain retail store promotional price tags of claim 11 wherein the imaging component includes at least one image capture device.

13. The system to detect and maintain retail store promotional price tags of claim 1 wherein the heuristic promotional price tag description extractor module displays a graphical user interface providing at least an exemplar of a promotional price tag.

14. The system to detect and maintain retail store promotional price tags of claim 13 wherein the graphical user interface also displays a conventional price tag adjacent the promotional price tag.

15. A method of detecting and maintaining retail store promotional price tags using heuristic classifiers comprises:
extracting heuristic descriptions from at least one exemplar promotional price tag having a barcode;
deriving heuristic parameters from the exemplar promotional price tag heuristic descriptions;
acquiring a plurality of shelf images at a retail store;
analyzing the acquired shelf images to localize barcodes;
extracting heuristic attributes from the acquired shelf images;
determining whether a localized barcode is related to a promotional price tag; and
reporting missing or invalid promotional price tags.

16. The method of claim 15 wherein extracting heuristic descriptions from at least one exemplar promotional price comprises:
displaying at least one selected exemplar promotional price tag from the retail store; and
prompting an operator to identify at least two heuristic elements of the selected exemplar promotional price tag, a one of the at least two heuristic elements being a barcode element, other of the at least two heuristic elements being non-barcode elements.

17. The method of claim 16 wherein a plurality of exemplar promotional price tags are displayed and extracting heuristic descriptions from at least one exemplar promotional price also comprises:
1) prompting an operator to select one of the displayed exemplar promotional price tags;
2) prompting the operator to identify at least two heuristic elements of the selected exemplar promotional price tag, a one of the at least two heuristic elements being a barcode element, other of the at least two heuristic elements being non-barcode elements; and
3) repeating steps 1 and 2 until each of the displayed exemplar promotional price tags has been selected.

18. The method of claim 17 wherein extracting heuristic descriptions from at least one exemplar promotional price may comprises prompting the operator to confirm that the exemplar promotional price tags not selected in step 3 include all of the heuristic elements identified in step 2.

19. The method of claim 17 wherein extracting heuristic descriptions from at least one exemplar promotional price also comprises combining and merging the identified heuristic elements into a single set of promotional price tag descriptions.

20. The method of claim 16 wherein deriving heuristic parameters from the exemplar promotional price tag heuristic descriptions comprises:
measuring the size of the barcode of the selected exemplar promotional price tag in pixels;
computing baseline scores for the non-barcode heuristic elements;
aggregating the baseline scores of the non-barcode heuristic elements to produce an overall baseline score; and
publishing the overall baseline score.

21. The method of claim 20 wherein computing baseline scores for the non-barcode heuristic elements comprises:
detecting attributes of the non-barcode heuristic element;
measuring the detected attributes of the non-barcode heuristic element; and
determining a baseline score for the non-barcode heuristic element based on the measured detected attributes.

22. The method of claim 21 wherein if the non-barcode heuristic element is color patch, detecting attributes of the non-barcode heuristic element includes performing a color patch detection on the selected exemplar promotional price tag, and measuring the detected attributes includes at least one of measuring size, measuring aspect-ratio, measuring fill-factor, or measuring position relative to the barcode.

23. The method of claim 21 wherein if the non-barcode heuristic element is number, detecting attributes of the non-barcode heuristic element includes performing a digit detection on the selected exemplar promotional price tag, and measuring the detected attributes includes at least one of measuring size, or measuring position relative to the barcode.

24. The method of claim 21 wherein if the non-barcode heuristic element is text, detecting attributes of the non-barcode heuristic element includes performing a text detection on the selected exemplar promotional price tag, and measuring the detected attributes includes at least one of measuring size, measuring similarity to an ideal text, or measuring position relative to the barcode.

25. The method of claim 21 wherein if the non-barcode heuristic element is logo, detecting attributes of the non-barcode heuristic element includes performing a logo detection on the selected exemplar promotional price tag, and measuring the detected attributes includes at least one of measuring size, measuring similarity to an ideal logo, or measuring position relative to the barcode.

26. The method of claim 20 wherein analyzing the acquired shelf images comprises:
 selecting one of the acquired shelf images;
 analyzing the selected acquired shelf image; and
 determining if a barcode is present in the selected acquired shelf image by localizing the barcode.

27. The method of claim 26 wherein extracting heuristic attributes from the acquired shelf images comprises:
 extracting heuristic attributes from at least one portion of the selected acquired shelf image; and
 determining whether or not the localized barcode is part of a promotional price tag.

28. The method of claim 27 wherein extracting heuristic attributes from the acquired shelf images comprises:
 producing a sub-image from the acquired shelf image;
 comparing heuristic elements of the sub-image to heuristic elements of the exemplar promotional price tags; and
 determining if the sub-image includes a promotional price tag.

29. The method of claim 28 wherein producing a sub-image from the acquired shelf image includes:
 measuring a size of the selected barcode in pixels; and
 cropping a portion of the acquired image to produce a sub-image.

30. The method of claim 28 wherein extracting heuristic attributes from the acquired shelf images also comprises:
 measuring the size of the barcode of the sub-image in pixels;
 computing sample scores for the non-barcode heuristic elements;
 aggregating the sample scores of the non-barcode heuristic elements to produce an overall sample score;
 publishing the overall sample score; and
 comparing the overall sample score to the overall baseline score to determine if the sub-image includes a promotional price tag.

31. The method of claim 30 wherein computing sample scores for the non-barcode heuristic elements comprises:
 detecting attributes of the non-barcode heuristic element;
 measuring the detected attributes of the non-barcode heuristic element; and
 determining a sample score for the non-barcode heuristic element based on the measured detected attributes.

32. The method of claim 31 wherein if the non-barcode heuristic element is color patch, detecting attributes of the non-barcode heuristic element includes performing a color patch detection on the sub-image, and measuring the detected attributes includes at least one of measuring size, measuring aspect-ratio, measuring fill-factor, or measuring position relative to the barcode.

33. The method of claim 31 wherein if the non-barcode heuristic element is number, detecting attributes of the non-barcode heuristic element includes performing a digit detection on the sub-image, and measuring the detected attributes includes at least one of measuring size, or measuring position relative to the barcode.

34. The method of claim 31 wherein if the non-barcode heuristic element is text, detecting attributes of the non-barcode heuristic element includes performing a text detection on the sub-image, and measuring the detected attributes includes at least one of measuring size, measuring similarity to an ideal text, or measuring position relative to the barcode.

35. The method of claim 31 wherein if the non-barcode heuristic element is logo, detecting attributes of the non-barcode heuristic element includes performing a logo detection on the sub-image, and measuring the detected attributes includes at least one of measuring size, measuring similarity to an ideal logo, or measuring position relative to the barcode.

36. The method of claim 26 wherein extracting heuristic attributes from the acquired shelf images comprises:
 extracting heuristic attributes from at least one portion of the selected acquired shelf image;
 determining whether or not the localized barcode is adjacent to a border of the acquired image;
 measuring the localized barcode's distance from the border of the acquired image if the localized barcode is adjacent to a border of the acquired image; and
 adjusting the overall baseline score based on the localized barcode's measured distance from the border of the acquired image.

* * * * *